United States Patent [19]

Lane

[11] Patent Number: 5,174,250
[45] Date of Patent: Dec. 29, 1992

[54] DUAL SEAL PUMP
[75] Inventor: William H. Lane, Chillicothe, Ill.
[73] Assignee: Caterpillar Inc., Peoria, Ill.
[21] Appl. No.: 813,737
[22] Filed: Dec. 27, 1991
[51] Int. Cl.$^5$ ............................................. F01P 5/10
[52] U.S. Cl. ................................. 123/41.44; 277/3; 277/27; 277/59; 415/229
[58] Field of Search ............... 123/41.44, 41.46, 41.47, 123/198 C; 415/168.2, 229, 230, 231; 277/3, 15, 27, 73, 135, 58, 59

[56] References Cited

U.S. PATENT DOCUMENTS

| | | | |
|---|---|---|---|
| 3,474,734 | 10/1969 | Stogner | 415/230 |
| 3,943,717 | 3/1976 | Schexnayder | 60/453 |
| 4,290,611 | 9/1981 | Sedy | 277/27 |
| 4,537,385 | 8/1985 | Bragg et al. | 277/27 |
| 4,632,402 | 12/1986 | Daeyaert | 277/15 |

Primary Examiner—Noah P. Kamen
Attorney, Agent, or Firm—Diana L. Charlton

[57] ABSTRACT

Pressurizing an intermediate fluid chamber of a pump housing is useful to substantially eliminate fluid loss across the seal faces in the pump housing. The subject dual seal pump has a spring-loaded diaphragm in an intermediate fluid chamber of the pump housing separating the intermediate fluid chamber into primary and secondary compartments. A fluid chamber in the pump housing is in fluid communication with the primary compartment of the intermediate fluid chamber. A fluid connecting means, including a conduit, an annulus, a pair of passages, and a recess communicate fluid into the primary compartment of the intermediate fluid chamber. The secondary compartment of the intermediate fluid chamber contains a non-corrosive fluid which is pressurized accordingly by the spring-loaded diaphragm. The result is a higher pressure in the second compartment of the intermediate fluid chamber which substantially eliminates fluid loss across the seal. A small pressure difference between the intermediate fluid chamber and an atmospheric pressure chamber may allow a minute amount of fluid leakage across the seal. However, the buffer fluid contained in the intermediate fluid chamber has no corrosion inhibitors to score the seal face, thus, a longer seal life is obtained.

29 Claims, 2 Drawing Sheets

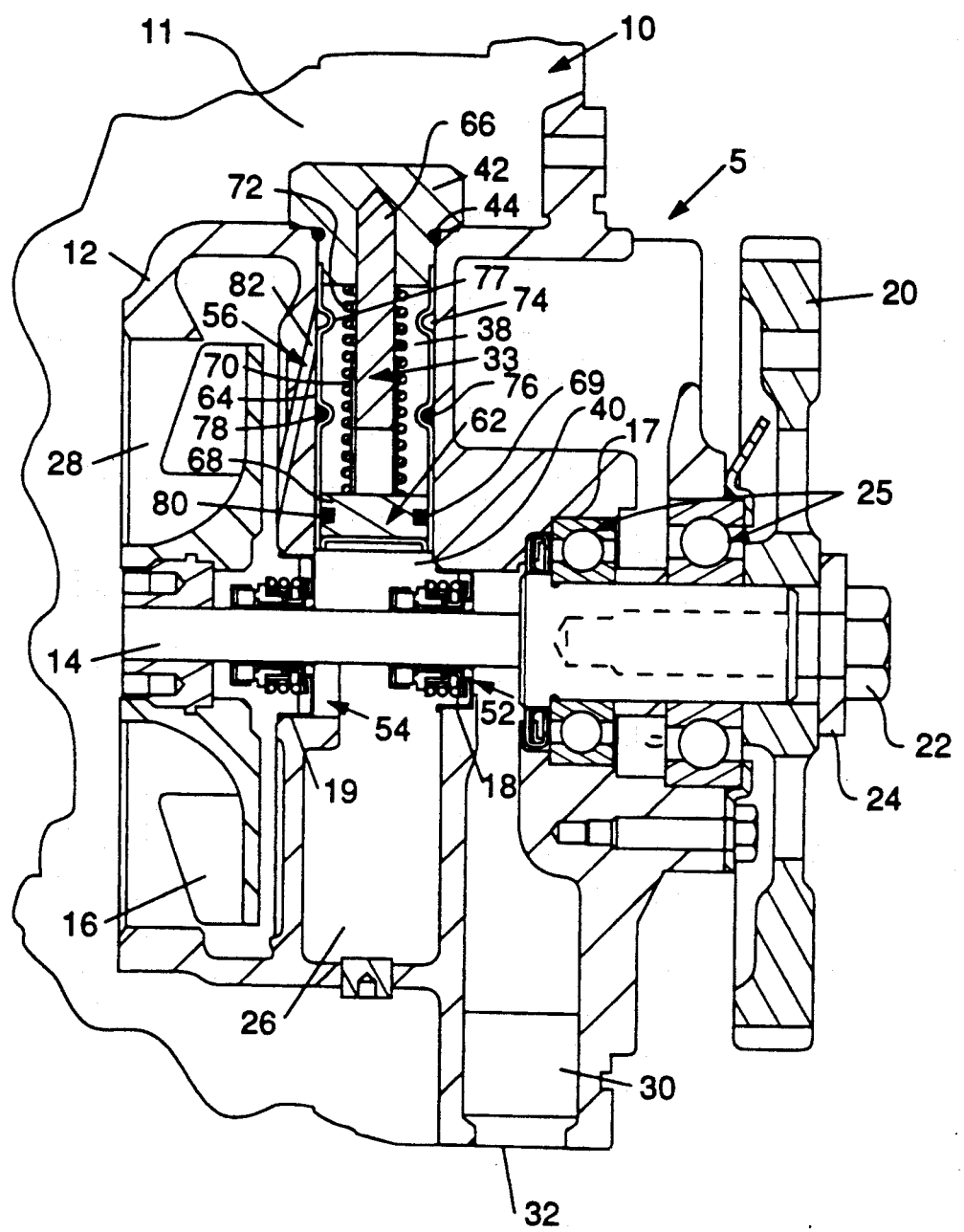

5,174,250

DUAL SEAL PUMP

TECHNICAL FIELD

This invention relates to pump systems for internal combustion engines and more particularly to a dual seal pump with an internal pressure source therefor.

BACKGROUND ART

The cooling fluid circulating pump for many internal combustion engines has a single seal disposed between two chambers of the pump housing with one chamber typically being a pressurized fluid chamber and the other chamber being at atmospheric pressure. The seal is provided between the chambers to primarily prevent the loss of the fluid under pressure. The nature of sealing allows some fluid leakage between the sliding faces of the seal. Corrosion inhibitors present in the fluid, namely silicates, are deposited on the seal faces and result in rapid scoring of the seal faces. Therefore, premature failure of the seal often occurs due to the progressive leakage of fluid across the seal face.

It has been shown in gas pumping designs that a lubricant chamber may be provided adjacent a pump chamber. In this design, the pump chamber contains pressurized gas at a relatively constant pressure and the lubricant chamber is pressurized from an external source. Adjustments are made so that the pressure in the lubricant chamber is greater than the pressure in the pump chamber. A mechanical seal is provided to separate the lubricant chamber from the pump chamber. The addition of pressure into the lubricant chamber substantially eliminates gas loss across the mechanical seal face. Some of the problems encountered therewith is that the external pressure source adds weight and cost if used for an engine. In addition to the above problems, pressure fluctuations within the pump chamber may require subsequent pressure adjustments in the lubricant chamber. The subsequent pressure adjustments in the lubricant chamber would not be made automatically, and if not corrected in a timely manner, could allow leakage of gas from the pump chamber.

The present invention is directed to overcoming one or more of the problems as set forth above.

DISCLOSURE OF THE INVENTION

In one aspect of the present invention, a fluid circulating pump having a housing and rotatably mounting a shaft is adapted for use in an internal combustion engine. The pump includes a first and a second fluid chamber which are defined by the housing. The second fluid chamber is located adjacent the first fluid chamber. A pair of seals are disposed in the housing in sealing engagement with the shaft and operatively associated with the first fluid chamber with one seal sealingly separating the fluid chambers. A means is provided for separating the first fluid chamber into primary and secondary compartments. A means for fluidly connecting the primary compartment of the first fluid chamber and the second fluid chamber is also included.

In another aspect of the present invention, an internal combustion engine has a conventional cylinder block. A cooling system is included having a fluid circulating pump which has a housing rotatably mounting a shaft and a means for operatively driving the shaft. The fluid circulating pump includes a first and a second fluid chamber which are defined by the housing. The second fluid chamber is located adjacent the first chamber. A pair of seals are disposed in the housing in sealing engagement with the shaft and operatively associated with the first fluid chamber with one seal sealingly separating the fluid chambers. A means is provided for separating the first fluid chamber into primary and secondary compartments. A means for fluidly connecting the primary compartment of the first fluid chamber and the second fluid chamber is also included.

The present invention is desirable in that the first fluid chamber is provided to substantially eliminate fluid loss across the seal which separates the first and second fluid chambers.

BRIEF DESCRIPTION OF THE DRAWINGS

FIG. 2 is a diagrammatic section view of an alternative embodiment of the present invention.

BEST MODE FOR CARRYING OUT THE INVENTION

Figure 1:
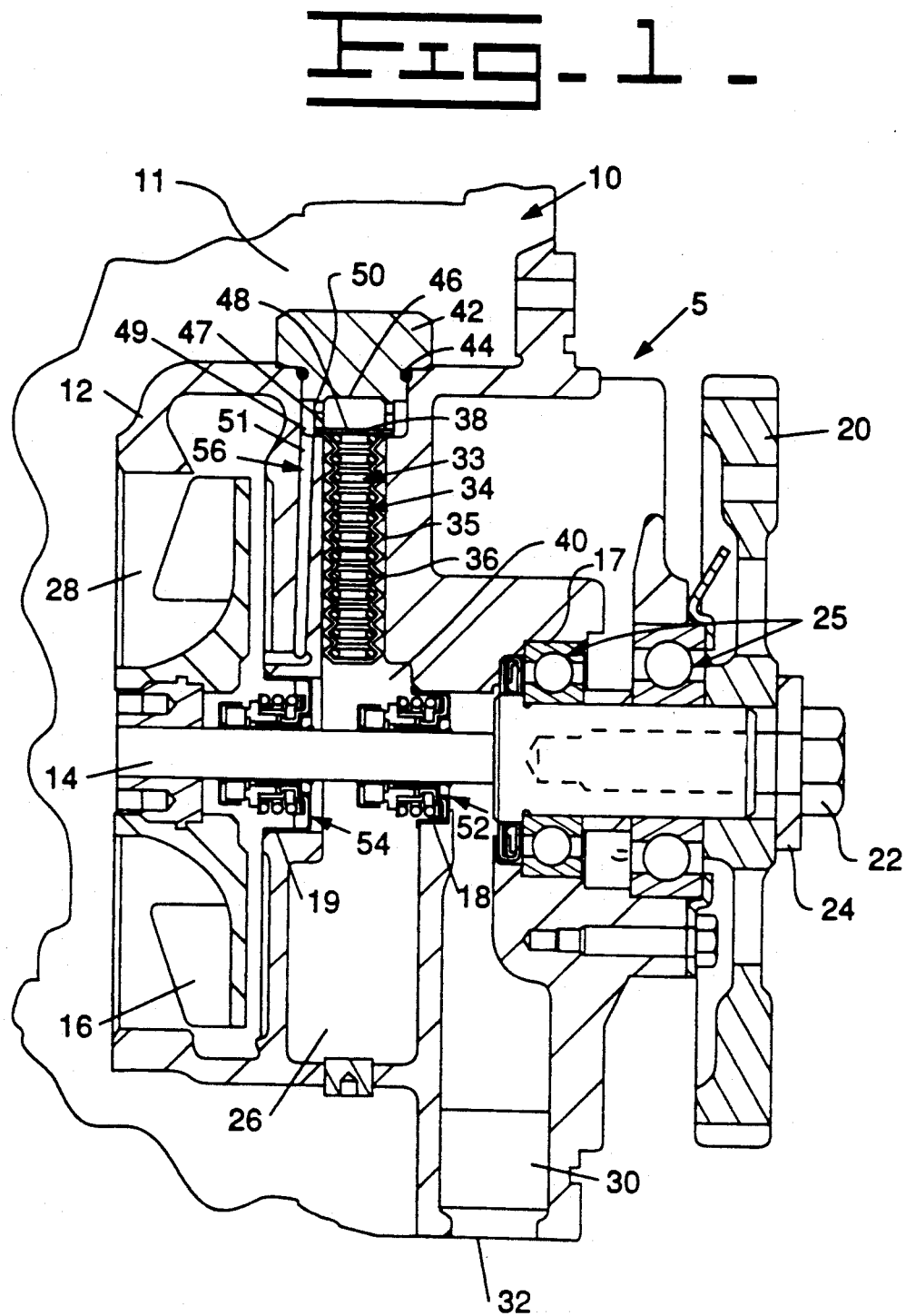
FIG. 1 is a diagrammatic section view of an embodiment of the present invention.

A cooling fluid circulating pump 5 for an internal combustion engine 10 having a conventional cylinder block 11 is shown in FIG. 1. The circulating pump 5 is conventionally mounted to the cylinder block 11. The circulating pump 5 pumps coolant through a cooling system (not shown) having a radiator (not shown) and pressure cap (not shown) and includes a housing 12, a shaft 14 rotatably mounted in the housing 12, and an impeller 16 mounted to the shaft for rotation therewith. The housing 12 defines first 17, second 18, and third 19 axially aligned bores. A gear 20 is conventional driven, such as by a crankshaft (not shown), and fastened by a bolt 22 and washer 24 to the shaft 14. A bearing assembly 25 is disposed within the first bore 17 of the housing for rotatably supporting the shaft 14.

First 26, second 28, and third 30 fluid chambers are defined by the housing 12. The first or intermediate fluid chamber 26 is disposed between and adjacent the second and third fluid chambers 28,30. The second fluid chamber 28 contains and circulates cooling system coolant by means of the impeller 16 located within the chamber 28. The third fluid chamber 30 has an opening 32 to atmospheric air. A means 33 is provided for separating the intermediate fluid chamber 26 into primary and secondary compartments 38,40. The means 33 may include, for example, a diaphragm 34 having an outer flexible housing 35 and a coil-spring 36. The diaphragm 34 is positioned in the first fluid chamber 26 and removably attached to the housing 12 by a threaded plug 42. The plug 42 is threaded into the housing 12 and sealed in a conventional manner, such as by an o-ring 44. The plug 42 has a recess 46 defined by a cylindrical wall 47 which fluidly communicates with the primary compartment 38 through an opening 48 in the housing 35. The cylindrical wall 47 cooperates with the housing 12 to define an annulus 49. A pair of passages 50 extend through the cylindrical wall 47 of the plug 42 to fluidly connect the recess 46 with the annulus 49. A conduit 51 is located in the housing 12 and fluidly connects the second fluid chamber 28 to the annulus 49.

A pair of seal assemblies 52 and 54 are disposed in the second and third bores 18,19, respectively, of the housing 12 in sealing engagement with the shaft 14 and are operatively associated with the intermediate fluid chamber 26. The seal assemblies 52 and 54 sealingly separate the intermediate fluid chamber 26 from the third and second fluid chambers 30 and 28, respectively.

A means 56 is provided for fluidly connecting the primary compartment 38 of the intermediate fluid chamber 26 and the second fluid chamber 28. The means 56 may include, for example, the conduit 51, the annulus 49, the passages 50, the recess 46, and the opening 48.

The secondary compartment 40 of the intermediate fluid chamber 26 contains a preselected volume of buffer fluid in which the volume is greater than that shown in the drawings. The buffer fluid may be, for example, anhydrous propylene glycol, which has non-corrosive properties, a high boiling — low freezing point (>300 F, <−40 F), and is compatible with seal materials. Any buffer fluid with similar characteristics may be considered.

Another embodiment of the present invention is shown in FIG. 2. It should be noted that the same reference numerals of the first embodiment are used to designate similarly constructed counterpart elements of the embodiment.

In this embodiment, the means 33 for separating the first or intermediate chamber 26 into primary and secondary compartments 38,40 is a piston assembly 62. The piston assembly 62 includes an outer housing 64, a rod 66 disposed in the housing 64 and is pressed into the plug 42 in a conventional manner, a head 68 slidably disposed in the housing 64 and having an annulus 69, a sleeve 70 fastened to the head 68 and which telescopically slidably encircles the rod 66, and a spring 72 biasing the head 68 toward the secondary chamber 40. The housing 64 has a pair of annuluses 74,76. The annulus 74 has an opening 77 which fluidly communicates with the primary compartment 38 of the intermediate fluid chamber 26. An o-ring 78 is seated within the annulus 76 and another o-ring 80 is seated within the annulus 69 of the head 68 for sealing between the primary and secondary compartments 38,40. A conduit 82 is located in the housing 12 and fluidly connects the second fluid chamber 28 to the annulus 74. In this embodiment, the means 56 for fluidly connecting the primary compartment 38 of the intermediate fluid chamber 26 and the second fluid chamber 28 includes the conduit 82, the annulus 74, and the opening 77.

Industrial Applicability

During operation, heat is generated within the internal combustion engine 10. The heat must be continually dissipated in order to avoid damage to the engine 10 and its various components. Therefore, the pump 5 is provided to circulate coolant throughout the cooling system of the internal combustion engine 10 to cool the engine 10. The fluctuating engine temperatures cause the pressure of the coolant within the cooling system to vary with the radiator cap providing a maximum relief pressure. The coolant at its various pressures is circulated through the second fluid chamber 28 and the cooling system by the impeller 16.

The coolant in the second fluid chamber 28 flows through the conduit 51, the annulus 49, the passages 50, the recess 46 of the plug 42, and the opening 48 of the housing 35 thereby filling the primary compartment 38 of the intermediate fluid chamber 26. The conduit 51 should be disposed so that the inlet from the second fluid chamber 28 is in close proximity to the seal assembly 54. This is necessary so that the coolant near the seal assembly 54 will flow into the primary compartment 38 establishing a reference pressure in the primary compartment 38 substantially the same as the pressure near the seal assembly 54. The coolant exerts a force against the diaphragm 34 biasing the diaphragm 34 toward the secondary compartment 40 pressurizing the buffer fluid to a pressure at least equal to the second fluid chamber pressure. Since it is known that fluid migrates from a high pressure area to an area of lower pressure and the pressure of the secondary compartment 40 and the second fluid chamber 28 are substantially equal, leakage of coolant is substantially eliminated across the seal 54.

Preferably, a slightly greater pressure in the secondary compartment 40 would increase the efficiency of the invention. This is accomplished through the use of the spring 36. The spring 36 exerts a force upon the housing 35 biasing the housing 35 toward the secondary compartment 40, thereby, generating a static presser in the secondary compartment 40. The static pressure and the coolant pressure cooperate to establish a pressure in the secondary compartment 40 greater than the pressure in the second fluid chamber 28 at the seal face. The pressure difference between the secondary compartment 40 and the second fluid chamber is related to the spring rate of the spring 36, with the secondary compartment 40 having a minimal pressure generally about 6.89 kPa (1 psi) higher than the second fluid chamber 28. Due to the varying pressure in the cooling system, and consequently, the second fluid chamber 28, the pressure within the primary compartment 38 will vary accordingly. It should be noted that the pressure difference remains constant between the second fluid chamber 28 and the secondary compartment 40 as the pressure varies within the second fluid chamber 28. The greater pressure in the secondary compartment 40 substantially eliminates leakage across the seal 54.

The opening 32 to atmospheric air in the third fluid chamber 30 results in a small pressure difference between the secondary compartment 40 and the third fluid chamber 30. While a minute amount of leakage across the seal 52 may occur, the buffer fluid contained in the secondary compartment 40 has no corrosion inhibitors to score the seal 52, thus, a longer seal life is obtained. Any buffer fluid that may leak across the seal 52 is drained from the third fluid chamber 30 through the opening 32 so that the buffer fluid never contacts the bearing assembly 25.

In the embodiment of FIG. 2, the secondary compartment 40 is pressurized to a pressure greater than that of the pressure of the second fluid chamber 28 through the use of the piston assembly 62. The coolant in the second fluid chamber 28 flows through the conduit 82 and through the opening 77 of the annulus 74 thereby filling the primary compartment 38 of the intermediate fluid chamber 26. The spring 72 exerts a force upon the head 68 biasing the head 68 toward the secondary compartment 40, thereby, generating a static pressure in the secondary compartment 40. The static pressure and the coolant pressure cooperate to establish a pressure in the secondary compartment 40 greater than the pressure in the second fluid chamber 28. It should be understood that all other principles and techniques for the first embodiment can be applied to the embodiment of FIG. 2. It should also be noted that the pressure difference remains constant between the second fluid chamber 28 and the secondary compartment 40 as the pressure varies within the second fluid chamber 28 as in the embodiment of FIG. 1.

In view of the above, it is readily apparent that the present invention provides an improved cooling fluid circulating pump with increased seal life. This is accomplished by the addition of an intermediate fluid chamber between the pressurized fluid chamber and the chamber at atmospheric pressure. The intermediate chamber is pressurized to a pressure at least equal to and preferably slightly greater than that of the pressurized fluid chamber. The pressure difference between the intermediate fluid chamber and the pressurized fluid chamber substantially eliminates leakage across the seal which separates the two chambers. The use of a buffer fluid in the intermediate fluid chamber prevents damage to the face of the seal which separates the intermediate chamber from the chamber at atmospheric pressure resulting in longer seal life.

I claim:

1. A fluid circulating pump having a housing rotatably mounting a shaft adapted for use in an internal combustion engine, comprising:
   a first fluid chamber defined by the housing;
   a second fluid chamber defined by the housing and being located adjacent the first fluid chamber;
   means for separating the first fluid chamber into primary and secondary compartments;
   a pair of seal assemblies disposed in the housing in sealing engagement with the shaft and operatively associated with the first fluid chamber with one of the seals sealingly separating the second fluid chamber from the secondary compartment of the first fluid chamber; and
   means for fluidly connecting the primary compartment of the first fluid chamber and the second fluid chamber.

2. The pump of claim 1, wherein a preselected volume of buffer fluid is contained in the secondary compartment of the first fluid chamber.

3. The pump of claim 2, wherein the use in a cooling system for an internal combustion engine coolant is contained in the second fluid chamber and is communicated through the connecting means to the primary compartment of the first fluid chamber.

4. The pump of claim 3, wherein the separating means includes a diaphragm.

5. The pump of claim 4, wherein the diaphragm has an outer housing positioned in the first fluid chamber and a spring biasing the outer housing toward the secondary compartment.

6. The pump of claim 5, including a plug removably attaching the outer housing to the housing and having a cylindrical wall, the fluid connecting means includes a conduit located in the housing in close proximity to the seal, an annulus defined by the cylindrical wall in cooperation with the housing, a passage extending through the cylindrical wall, a recess defined by the cylindrical wall, and an opening in the outer housing.

7. The pump of claim 6, wherein the coolant has a variable pressure and the spring and housing of the diaphragm are operatively associated with the fluid connecting means to pressurize the secondary compartment of the first fluid chamber to a pressure greater than the pressure of the second fluid chamber throughout the pressure variations of the coolant.

8. The pump of claim 3, wherein the separating means includes a piston assembly.

9. The pump of claim 8, wherein the piston assembly includes an outer housing, a head slidably disposed in the outer housing, and a spring biasing the head toward the secondary compartment.

10. The pump of claim 9, wherein the piston assembly further includes a rod pressed into the plug and a sleeve fastened to the head and telescopically slidably encircling the rod.

11. The pump of claim 10, wherein the fluid connecting means includes a conduit located in the housing in close proximity to the seal, an annulus in the outer housing, and an opening in the annulus.

12. The pump of claim 11, wherein the coolant has a variable pressure and the spring and head of the piston assembly are operatively associated with the fluid connecting means to pressurize the secondary compartment of the first fluid chamber to a pressure greater than the pressure of the second fluid chamber throughout the pressure variations of the coolant.

13. The pump of claim 1, including another fluid chamber defined by the housing which is adjacent the first fluid chamber.

14. The pump of claim 13, wherein the housing defines an opening between the another fluid chamber and atmospheric air.

15. An internal combustion engine having a conventional block, a cooling system having a cooling fluid circulating pump conventionally mounted to the cylinder block, the pump having a housing rotatably mounting a shaft, and a means for operatively driving the shaft, comprising:
   a first fluid chamber defined by the housing;
   a second fluid chamber defined by the housing and being located adjacent the first fluid chamber;
   means for separating the first fluid chamber into primary and secondary compartments;
   a pair of seal assemblies disposed in the housing in sealing engagement with the shaft and operatively associated with the first fluid chamber with one of the seals sealingly separating the second fluid chamber from the secondary compartment of the first fluid chamber; and
   means for fluidly connecting the primary compartment of the first fluid chamber and the second fluid chamber.

16. The pump of claim 15, wherein a preselected volume of buffer fluid is contained in the secondary compartment of the first fluid chamber.

17. The pump of claim 16, wherein the use in a cooling system for an internal combustion engine coolant is contained in the second fluid chamber and is communicated through the connecting means to the primary compartment of the first fluid chamber.

18. The pump of claim 17, wherein the separating means includes a diaphragm.

19. The pump of claim 18, wherein the diaphragm has an outer housing positioned in the first fluid chamber and a spring biasing the outer housing toward the secondary compartment.

20. The pump of claim 19, including a plug removably attaching the outer housing to the housing and having a cylindrical wall, the fluid connecting means includes a conduit located in the housing in close proximity to the seal, an annulus defined by the cylindrical wall in cooperation with the housing, a passage extending through the cylindrical wall, a recess defined by the cylindrical wall, and an opening in the outer housing.

21. The pump of claim 20, wherein the coolant has a variable pressure and the spring and housing of the diaphragm are operatively associated with the fluid connecting means to pressurize the secondary compartment of the first fluid chamber to a pressure greater than the pressure of the second fluid chamber throughout the pressure variations of the coolant.

22. The pump of claim 17, wherein the separating means includes a piston assembly.

23. The pump of claim 22, wherein the piston assembly includes an outer housing, a head slidably disposed in the outer housing, and a spring biasing the head toward the secondary compartment.

24. The pump of claim 23, wherein the piston assembly further includes a rod pressed into the plug and a sleeve fastened to the head and telescopically slidably encircling the rod.

25. The pump of claim 24, wherein the fluid connecting means includes a conduit located in the housing in close proximity to the seal, an annulus in the outer housing, and an opening in the annulus.

26. The pump of claim 25, wherein the coolant has a variable pressure and the spring and head of the piston assembly are operatively associated with the fluid connecting means to pressurize the secondary compartment of the first fluid chamber to a pressure greater than the pressure of the second fluid chamber throughout the pressure variations of the coolant.

27. The pump of claim 15, including another fluid chamber defined by the housing which is adjacent the first fluid chamber.

28. The pump of claim 27, wherein the housing defines an opening between the another fluid chamber and atmospheric air.

29. A fluid circulating pump having a housing rotatably mounting a shaft adapted for use in an internal combustion engine, comprising:

a first fluid chamber defined by the housing;

a second fluid chamber defined by the housing and being located adjacent the first fluid chamber, a first fluid contained within the second fluid chamber;

means for separating the first fluid chamber into primary and secondary compartments and for exerting a force on fluid within the secondary compartment, a second different fluid contained within the secondary compartment;

a pair of seal assemblies disposed in the housing in sealing engagement with the shaft and operatively associated with the first fluid chamber with one of the seals sealingly separating the second fluid chamber from the secondary compartment of the first fluid chamber; and means for fluidly connecting the primary compartment of the first fluid chamber and the second fluid chamber.

* * * * *